2 Sheets--Sheet 1.

SOLOMON W. KELLY.

Improvement in Rotary Pumps.

No. 4,750. Reissued Feb. 13, 1872.

Witnesses.
R. T. Campbell
Jno Williams

Inventor
Solomon W. Kelley.
John C. Ferris Adm.r by his Atty
Mason Fenwick & Lawrence

THE NORRIS PETERS CO., WASHINGTON, D. C.

2 Sheets--Sheet 2.

SOLOMON W. KELLY.

Improvement in Rotary Pumps.

No. 4,750.

Reissued Feb. 13, 1872.

Witnesses:
P. T. Campbell
J. M. Williams

Inventor
Solomon W. Kelley
by his attys
Mason Fenwick & Lawrence

THE NORRIS PETERS CO., WASHINGTON, D. C.

UNITED STATES PATENT OFFICE.

JOHN C. FERRISS, (ADMINISTRATOR OF SOLOMON W. KELLY, DECEASED,) AND THOMAS J. HARDING, ASSIGNEE OF ONE-HALF INTEREST, OF NASHVILLE, TENNESSEE.

IMPROVEMENT IN ROTARY PUMPS.

Specification forming part of Letters Patent No. 120,819, dated November 14, 1871; reissue No. 4,750, dated February 13, 1872.

Specification forming part of Letters Patent No. 120,819, dated November 14, 1871, to SOLOMON W. KELLY.

*To all whom it may concern:*

Be it known that SOLOMON W. KELLY, late of Nashville, in the county of Davidson and State of Tennessee, deceased, did invent a new and Improved Rotary Pump; and we do hereby declare that the following is a full, clear, and exact description thereof, reference being had to the accompanying drawing making part of this specification, in which—

Figure 1:
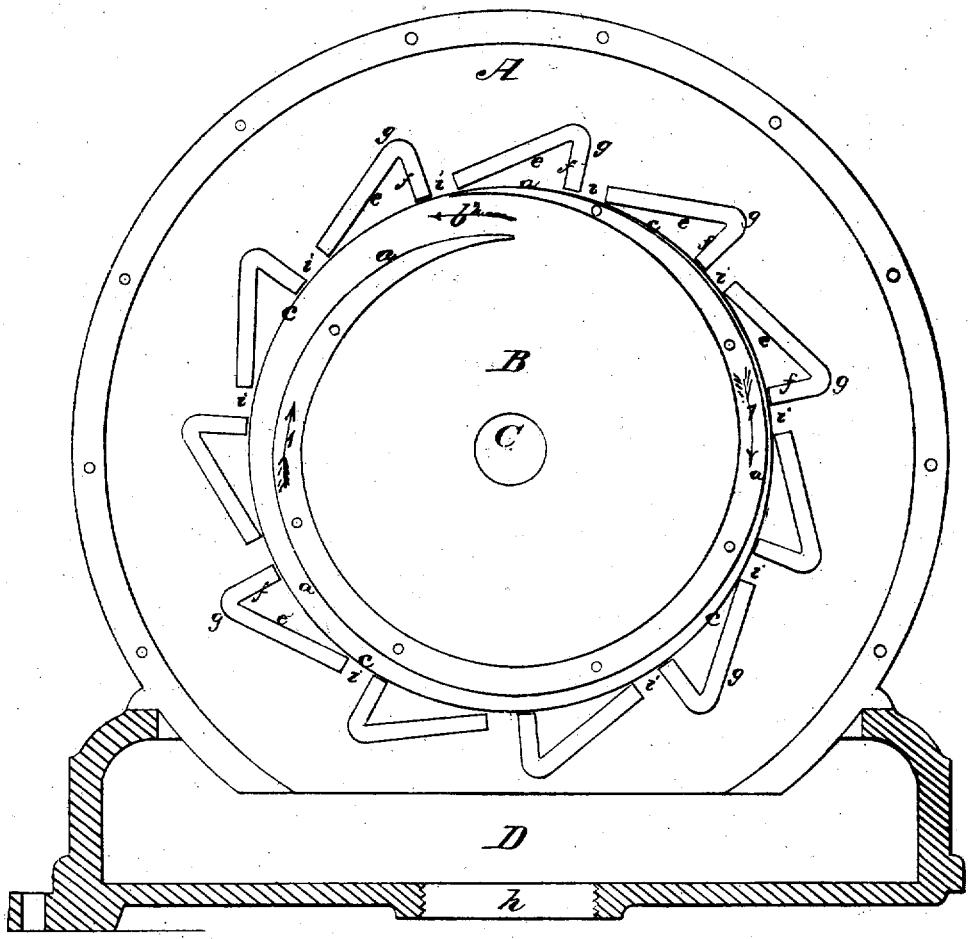
Figure 2:
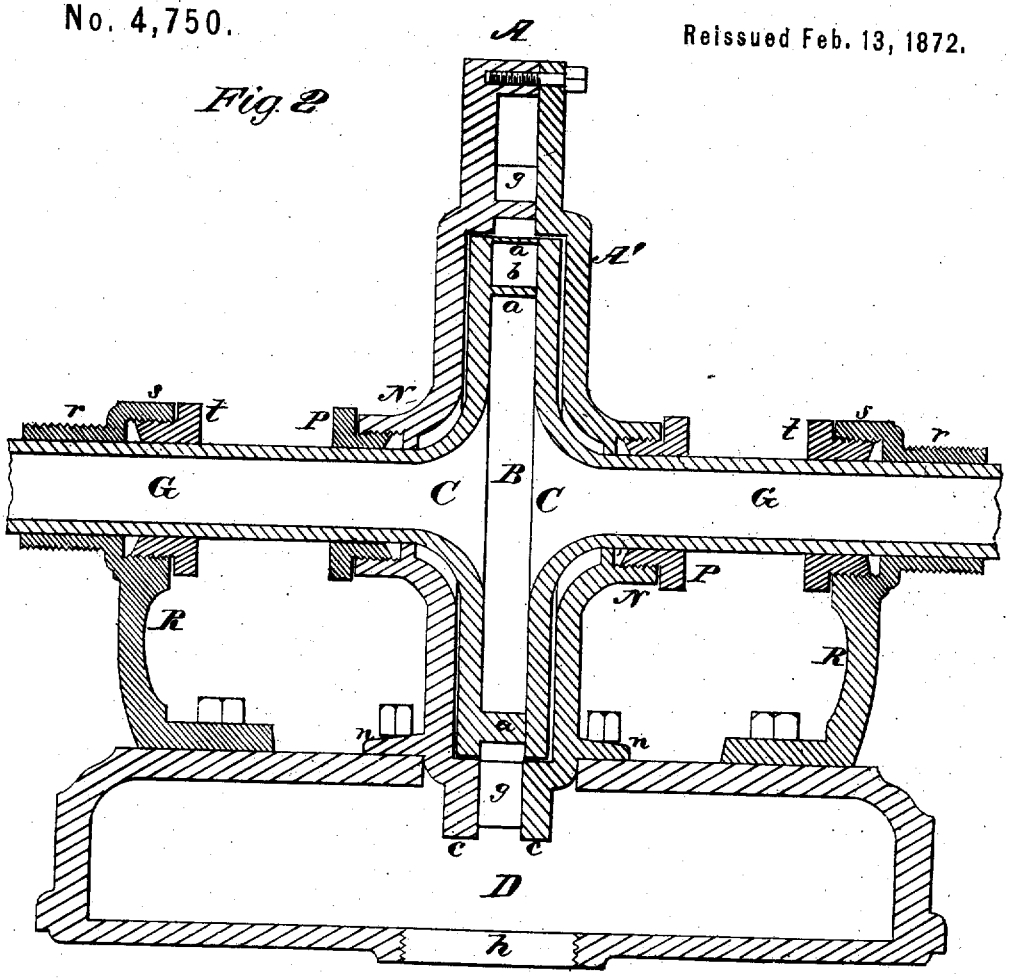

Figure 1, Plate 1, is a view of the interior of the pump, as seen by removing the side plate of the case and making a diametrical section through the hollow base. Fig. 2, Plate 2, is a section taken in a vertical plane transversely through the center of the pump.

Similar letters of reference indicate corresponding parts in the several figures.

This invention relates to what we shall term a combined vacuum and pressure rotary pump. One of the greatest difficulties attending the practical operation of pumps, both of the rotary and reciprocating kinds, is friction and the rapid cutting and wearing away of all parts which are subjected to friction. In the pump which we shall hereinafter explain there are no surfaces inside of the pump-case or shell which impinge upon each other, and which are liable to be cut or worn out by sand and other foreign impurities which may be in the water, and the only friction of impinging surfaces which is to be overcome is the slight amount of friction incident to the rotation of the hollow eduction-shafts of the pistons in their journals, which latter are outside of the pump-case. We also arrange within a narrow cylindrical case—which may be arranged either horizontally, vertically, or in any other position—a rotating hollow wheel or piston, the periphery of which presents a scroll or convolute surface, or it may present a number of curved surfaces eccentric to the axis of the wheel; and in combination therewith we employ stationary checks for the water thrown off from the said wheel or piston, which checks are separated by outlets or ports and present surfaces which are tangent and also radial to the wheel or piston, and which operate to check the water until it is forced out through the ports by the convolute or eccentric external surfaces of the wheel or piston, as will be hereinafter explained. We also employ one or two central inlet-shafts directly in connection with the side plates forming the chamber for the scroll, and thus make the inlet-pipe or pipes the journals for this wheel and an immediate portion of the water-chamber, and at the same time arrange the bearings therefor outside of the pump-case, free from injury by sand or other floating matters in the water.

The following description of this invention will enable others skilled in the art to understand its construction and operation.

In the accompanying drawing, A represents the hollow case or shell of the pump, which is provided with a removable side or cap, A′, to allow free access to the interior of the case whenever desired. This case presents a free opening below into a hollow base, D, out of which water is allowed to flow through an opening, *h*, and upon which the case is firmly secured by bolts passed through flanges *n n*, as shown in Fig. 2. In practice it is preferable to discharge through the highest point of the pump-case in order to prevent an accumulation of air therein, although by the use of an air-outlet cock the water may be discharged downwardly through the hollow base D, as above described. Within the case A is a hollow wheel, B, or piston, which is fitted loosely into chambers made concentrically into the side plates of this case A, but which do not bear or impinge against any surface inside of the case. The central shafts G G of this wheel B are hollow, and at their junction with the side of the wheel they flare inwardly, as shown in Fig. 2, so that no obstruction or angle will be left which would interfere with the free influx of water into the wheel. The shafts G G extend out from the center of the wheel B through stuffing-boxes N P of the case A, and have their bearings in journal-boxes *s* on stationary standards R. The suction-pipes are screwed upon the threaded sleeves *r* of the journal-boxes *s*, and these boxes may be sealed by packing and screw-caps *t*, as shown in Fig. 2. It should be understood that one of the shafts G may be closed if it is desired to take in water only on one side of the wheel B. The wheel or piston is composed of two circular plates, *c c*, which are enlargements of the pipes C C, between which is confined a convolute or scroll, *a*, one end of which is flush with the circumference of the said plates *c c*, while the other, which is, of course, nearest the axis of the plate, laps more or less, as shown in Fig. 1. The inner surface of the scroll has the same relation to the plates *c c* as the outer surface, both surfaces terminating in an outlet-passage, *b*, through which water is caused to flow as vacuums are formed for its reception during the rapid rotation of the wheel by belts applied to pulleys on the hollow shafts G G. Instead of one or a continuous scroll or convolute, sections of the same with outlet-spaces between may be used, or an equivalent thereof would be segments of a circle applied eccentrically and at proper intervals apart between the two circular plates *c c*, the outer end of each segment touching the circumference of these plates. We thus have what is in effect, but to a less degree, the wheel which we have represented to force the water which escapes from passage *b* away from the wheel at all points of its periphery. The water is caused to escape from the wheel B through passage *b*, and at a tangent thereto, and it is necessary to provide means for checking it, so that it shall not recoil upon the onflowing current at *b*. To do this effectually, we arrange at proper distances apart around the wheel a number of stationary angular water-checks, *g*, between which are outlet-ports *i i*, through which latter the water is forced by the periphery of the scroll *a*. Each check presents to the wheel a surface, *e*, which is tangent to its circumference, and a surface, *f*, which is radial to the axis of this wheel. The water escaping from the passage *b* first strikes the tangential surfaces *e*, which direct it along and against the radial surfaces *f*, thus breaking its tendency to follow the half of the wheel. The periphery of the scroll *a* now comes into action and forces the water from between the flanges *c c* out through the ports *i i*, all around the wheel into the external chamber of the case A, from which the water escapes either downwardly through the base D or out through the top of the case, as may be found desirable. The arrows 11 show the direction in which the scroll rotates. The arrow 2 shows the course the water takes.

Having described this invention, what we claim as new, and desire to secure by Letters Patent, is—

1. One or two central inlet supply-pipes or hollow journals, G, forming extensions of the plates of wheel B, in combination with one or more scrolls or wedges, *a*, applied between said plates, substantially as described.

2. The water-checks *g*, as described, combined with the rotary hollow wheel B and *a*, substantially as described.

JNO. C. FERRISS,
*Administrator of S. W. Kelly, deceased.*

Witnesses to signature of J. C. FERRISS:
JAMES C. MALONE,
GEO. A. DIGGOUS.

THOMAS J. HARDING,
*Assignee.*

Witnesses to signature of T. J. HARDING:
S. M. POOL,
CHAS. B. STILWELL.